(12) United States Patent
Kim et al.

(10) Patent No.: US 11,838,651 B2
(45) Date of Patent: Dec. 5, 2023

(54) IMAGE PROCESSING APPARATUS INCLUDING NEURAL NETWORK PROCESSOR AND METHOD OF OPERATING THE SAME

(71) Applicant: Samsung Electronics Co., Ltd., Suwon-si (KR)

(72) Inventors: Irina Kim, Seoul (KR); Youngil Seo, Seoul (KR); Dongpan Lim, Yongin-si (KR); Yunseok Choi, Seoul (KR); Jeongguk Lee, Seoul (KR); Hansol Lee, Seongnam-si (KR); Eundoo Heo, Daegu (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 200 days.

(21) Appl. No.: 17/392,918

(22) Filed: Aug. 3, 2021

(65) Prior Publication Data
US 2022/0182537 A1    Jun. 9, 2022

(30) Foreign Application Priority Data
Dec. 3, 2020    (KR) ........................ 10-2020-0167661

(51) Int. Cl.
*H04N 23/80*    (2023.01)
*G06T 3/40*    (2006.01)
(Continued)

(52) U.S. Cl.
CPC ............. *H04N 23/80* (2023.01); *G06N 3/045* (2023.01); *G06T 3/4015* (2013.01);
(Continued)

(58) Field of Classification Search
CPC ........ H04N 23/80; H04N 23/60; H04N 23/63; G06N 3/08; G06N 3/045; G06T 3/4015;
(Continued)

(56) References Cited

U.S. PATENT DOCUMENTS 7,548,659 B2    6/2009 Ofek et al.
7,756,407 B2    7/2010 Raskar
(Continued)

FOREIGN PATENT DOCUMENTS

KR    10-2083835 B1    3/2020

OTHER PUBLICATIONS

Irina Kim et al., "Deep Image Demosaicing for Submicron Image Sensors", Journal of Imaging Science and Technology, 63(6): 060410-1-060410-12, 2019.

*Primary Examiner* — Kelly L Jerabek
(74) *Attorney, Agent, or Firm* — Harness, Dickey & Pierce, P.L.C.

(57) ABSTRACT

An image processing apparatus includes a camera configured to generate first image data, a pre-processor configured to generate second image data based on performing a pre-processing operation on the first image data, a neural network processor configured to generate third image data based on performing an image processing operation on the second image data based on using a neural network model trained to perform one or more particular image processing operations, and a main processor configured to generate corrected image data based on performing a post-processing operation on the third image data.

17 Claims, 13 Drawing Sheets

(51) Int. Cl.
*G06T 5/00* (2006.01)
*G06N 3/045* (2023.01)
*H04N 23/63* (2023.01)

(52) U.S. Cl.
CPC .......... *G06T 3/4038* (2013.01); *G06T 3/4046* (2013.01); *G06T 5/002* (2013.01); *G06T 5/003* (2013.01); *G06T 5/007* (2013.01); *H04N 23/63* (2023.01); *G06T 2207/20081* (2013.01); *G06T 2207/20084* (2013.01); *G06T 2207/20221* (2013.01)

(58) Field of Classification Search
CPC ..... G06T 3/4038; G06T 3/4046; G06T 5/002; G06T 5/003; G06T 5/007; G06T 2207/20081; G06T 2207/20084; G06T 2207/20221; G06T 2207/10024; G06T 2207/20076; G06T 5/001
See application file for complete search history.

(56) References Cited

U.S. PATENT DOCUMENTS

| | | |
|---|---|---|
| 8,126,287 B2 | 2/2012 | Alon et al. |
| 8,184,182 B2 | 5/2012 | Lee et al. |
| 8,417,055 B2 | 4/2013 | Albu et al. |
| 8,654,201 B2 | 2/2014 | Lim et al. |
| 9,344,690 B2 | 5/2016 | Nowozin et al. |
| 10,311,560 B2 | 6/2019 | Sang et al. |
| 2019/0129530 A1 | 5/2019 | Shen |
| 2019/0304102 A1 | 10/2019 | Chen et al. |
| 2020/0007738 A1 | 1/2020 | Chu |
| 2020/0143519 A1 | 5/2020 | Gordon et al. |
| 2020/0211229 A1* | 7/2020 | Hwang .................. G06N 3/084 |
| 2021/0058568 A1* | 2/2021 | Ivanov Bonev ....... H04N 23/11 |
| 2021/0217134 A1* | 7/2021 | Okamura ............. H04N 23/843 |
| 2022/0070369 A1* | 3/2022 | Gordon ..................... G06T 1/00 |
| 2022/0083797 A1* | 3/2022 | Kim .................... G06F 18/2148 |
| 2023/0018004 A1* | 1/2023 | Wen .......................... G06T 5/00 |

* cited by examiner

IMAGE PROCESSING APPARATUS INCLUDING NEURAL NETWORK PROCESSOR AND METHOD OF OPERATING THE SAME

CROSS-REFERENCE TO RELATED APPLICATION

This application is based on and claims priority under 35 U.S.C. § 119 to Korean Patent Application No. 10-2020-0167661, filed on Dec. 3, 2020, in the Korean Intellectual Property Office, the disclosure of which is incorporated by reference herein in its entirety.

BACKGROUND

The inventive concepts relate to an image processing apparatus for performing an image processing operation by using a neural network processor and a method of operating the same.

Recently, demand for a camera module including an image sensor has been increasing. In particular, demands on pictures and images with high quality are increasing.

SUMMARY

The inventive concepts relate to an image processing apparatus including a neural network processor using a neural network model trained to perform a plurality of image processing operations and a method of operating the same. Such image processing operations may include removing defects such as blur, ghost, flare, and haze included in image data generated by a camera module (also referred to herein as a camera).

According to some example embodiments of the inventive concepts, an image processing apparatus may include a camera configured to generate first image data, a pre-processor configured to generate second image data based on performing a pre-processing operation on the first image data, a neural network processor configured to generate third image data based on performing an image processing operation on the second image data based on using a neural network model trained to perform one or more particular image processing operations, and a main processor configured to generate corrected image data based on performing a post-processing operation on the third image data.

According to some example embodiments of the inventive concepts, an image processing apparatus may include a display, an under display camera located under the display, and a neural network processor. The under display camera may be configured to generate first image data capturing an image of an exterior environment that is external to the image processing apparatus. The neural network processor may be configured to perform an image processing operation on the first image data based on using a neural network model trained to perform the image processing operation on image data generated by the under display camera.

According to some example embodiments of the inventive concepts, a method of operating an image processing apparatus may include obtaining first image data, generating second image data based on performing a pre-processing operation on the first image data, generating third image data based on performing an image processing operation on the second image data based on using a neural network model trained to perform one or more particular image processing operations, and generating corrected image data based on performing a post-processing operation on the third image data.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, example embodiments of the inventive concepts will be described in detail with reference to the accompanying drawings.

As described herein, when an operation is described to be performed "by" performing additional operations, it will be understood that the operation may be performed "based on" the additional operations, which may include performing said additional operations alone or in combination with other further additional operations.

Figure 1:
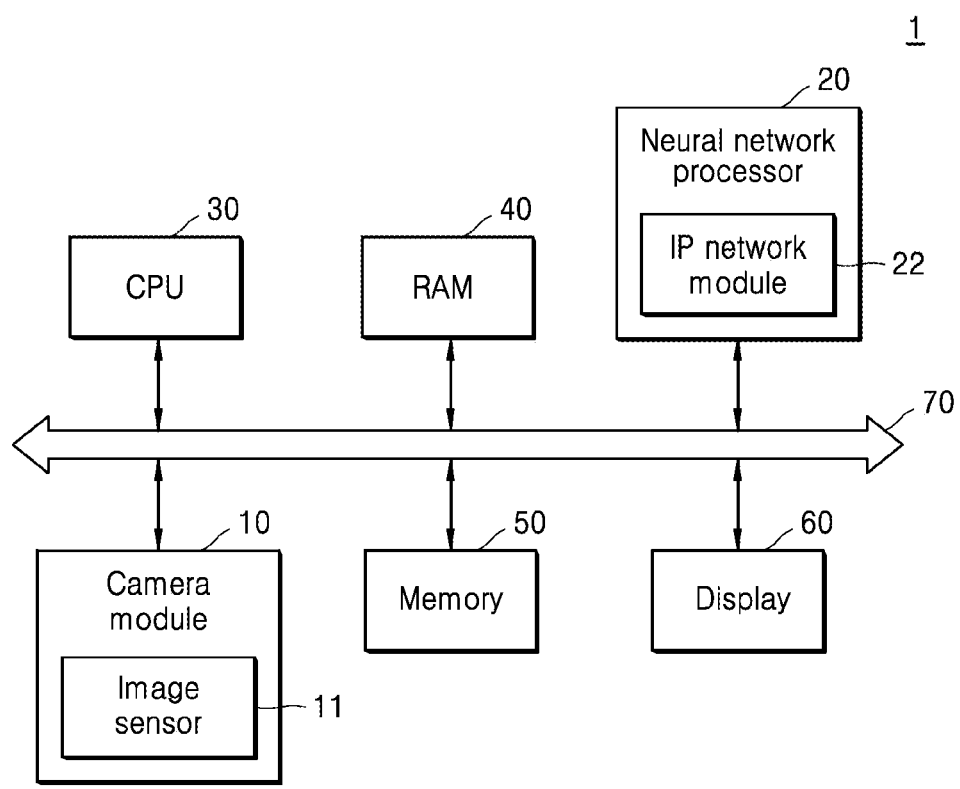
FIG. 1 is a block diagram illustrating a neural network system according to some example embodiments of the inventive concepts.

FIG. 1 is a block diagram illustrating a neural network system 1 according to some example embodiments of the inventive concepts.

The neural network system 1 may infer information included in input data by training (or learning) a neural network or analyzing the input data by using the neural network. The neural network system 1 may determine a situation based on the inferred information or may control elements of an electronic device in which the neural network system 1 is mounted. For example, the neural network system 1 may be applied to a smartphone performing voice recognition, image recognition, image classification, and image processing by using a neural network, a tablet device, a smart TV, an augmented reality (AR) device, an Internet of things (IoT) device, a self-driving vehicle, robots, a medical device, a drone, an advanced drivers assistance system (ADAS), an image display device, or a measuring device or may be mounted in one of various kinds of electronic devices. In some example embodiments, the neural network system 1 of FIG. 1 may be an application processor. Hereinafter, the neural network system 1 may be applied to (e.g., included in) an image processing apparatus and may perform image processing operations on image data of (e.g., image data generated by) a camera module 10. In some example embodiments, the neural network system 1 of FIG. 1 may be an image processing apparatus. A "camera module" may be referred to interchangeably herein as a "camera."

Referring to FIG. 1, the neural network system 1 may include the camera module 10, a neural network processor (or a neural network apparatus) 20, a central processing unit (CPU) 30, random access memory (RAM) 40, memory 50, and a display 60 (also referred to interchangeably herein as an image display device. The neural network system 1 may further include an input and output module, a security module, and a power control device or various kinds of processors.

In embodiments, some or all of elements of the neural network system 1 may be formed in one semiconductor chip. For example, the neural network system 1 may be implemented by a system on chip (SoC) and, in some example embodiments, may be referred to as an image chip. The elements of the neural network system 1 may communicate with one another through a bus 70.

The CPU 30 controls an overall operation of the neural network system 1. The CPU 30 may include a processor core or a plurality of processor cores. The CPU 30 may process or execute programs and/or data stored in a storage region such as the memory 50 by using the RAM 40.

For example, the CPU 30 may execute an application program and may control the neural network processor 20 to perform neural network-based tasks required in accordance with execution of the application program. The neural network may be a neural network model based on (e.g., including) at least one of an artificial neural network (ANN), a convolution neural network (CNN), a region with a convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, a plain residual network, a dense network, a hierarchical pyramid network, or a fully convolutional network. However, the neural network model is not limited thereto, and may, for example include other n-layered neural networks like a deep belief network, restricted Boltzmann machine, a deep learning system, deconvolutional neural networks (DCNN), stacked neural networks (SNN), deep belief networks (DBN), generative adversarial networks (GANs), restricted Boltzmann machines (RBM), and/or the like. Additionally, the neural network model may include other forms of machine learning models, such as, for example, linear and/or logistic regression, statistical clustering, Bayesian classification, decision trees, dimensionality reduction such as principal component analysis, expert systems; and/or combinations thereof, including ensembles such as random forests. In some example embodiments, the kinds of the neural network models are not limited thereto. In some example embodiments, the neural network model includes at least one of an artificial neural network (ANN) model or a convolution neural network (CNN) model.

The neural network processor 20 may perform a neural network operation based on the received input data. Furthermore, the neural network processor 20 may generate an information signal based on a result of performing the neural network operation. The neural network processor 20 may be implemented by a neural network operation accelerator, a coprocessor, a digital signal processor (DSP), an application specific integrated circuit (ASIC), a field-programmable gate array (FPGA), a graphics processing unit (GPU), a neural processing unit (NPU), a tensor processing unit (TPU), or a multi-processor system-on-chip (MPSoC).

The camera module 10 may capture an image of a subject (or an object) outside the neural network system 1 (e.g., an exterior environment that is external to an image processing apparatus that includes the neural network system 1) and may generate the image data. For example, the camera module 10 may include an image sensor 11. The image sensor 11 may convert an optical signal of the subject into an electrical signal by an optical lens (not shown). For this purpose, the image sensor 11 may include a pixel array in which a plurality of pixels are two-dimensionally arranged. For example, one of a plurality of reference colors may be allocated to each of the plurality of pixels. For example, the plurality of reference colors may include red, green, and blue (RGB) or red, green, blue, and white (RGBW).

The camera module 10 may generate the image data by using the image sensor 11. The image data may be referred to in various ways such as an image frame and frame data. The image data may be provided to the neural network processor 20 as the input data or may be stored in the memory 50. The image data stored in the memory 50 may be provided to the neural network processor 20.

The neural network processor 20 according to some example embodiments of the inventive concepts may receive the image data from the camera module 10 or the memory 50 and may perform the neural network operation based on the image data. The neural network processor 20 may include an image processing (IP) network module 22 defined through the neural network operation based on a particular (or, alternatively, predetermined) neural network model. A configuration of each of modules described hereinafter may be implemented by a software block executed by a particular (or, alternatively, predetermined) processor, an executive hardware block, or a combination of the software block and the hardware block.

The IP network module 22 according to some example embodiments is a neural network model trained to perform at least one of the image processing operations commonly performed on the image sensor 11 of the camera module 10. Here, the image processing operations may include various operations such as a bad pixel correction (BPC) operation, a lens shading correction (LSC) operation, a crosstalk correction operation, a white balance (WB) correction operation, a remosaic operation, a demosaic operation, a denoise operation, a deblur operation, a gamma correction operation, a high dynamic range (HDR) operation, and/or a tone mapping operation. In some example embodiments, the kinds of the image processing operations are not limited to the above-described example. The image processing operation performed by the IP network module 22 will be described in detail later with reference to FIG. 3.

The IP network module 22 may receive first image data generated by the image sensor 11 of the camera module 10 and may generate second image data by performing the image processing operations on the first image data.

The memory 50 may include at least one of volatile memory or non-volatile memory. The non-volatile memory includes read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), or ferroelectric RAM (FRAM). The volatile memory includes dynamic RAM (DRAM), static RAM (SRAM), synchronous DRAM (SDRAM), PRAM, MRAM, RRAM, or ferroelectric RAM (FeRAM). In some example embodiments, the memory 50 may include at least one of a hard disk drive (HDD), a solid state drive (SSD), a compact flash (CF) card, a secure digital (SD) card, a micro-SD card, a mini-SD card, an extreme digital (xD) card, or a memory stick.

The display 60 may display various contents (for example, a text, an image, a video, an icon, and a symbol) to a user based on the image data received from the neural network processor 20. For example, the display 60 may include a liquid crystal display (LCD), a light emitting diode (LED) display, an organic light emitting diode (OLED) display, a micro-electromechanical system (MEMS) display, or an electronic paper display. The display 60 may include a pixel array in which a plurality of pixels are arranged in a matrix in order to display an image.

According to some example embodiments, when the neural network system 1 is implemented by an electronic device such as a smartphone, the camera module 10 may be disposed (e.g., located) under the display 60, such that the display 60 is located between the camera module 10 and an exterior environment that is external to the image processing apparatus that includes the neural network system 1. Therefore, the camera module 10 may generate the image data (e.g., first image data as described herein) based on light reflected from the subject, passing through the display 60, and reaching the optical lens of the image sensor 11. A path of the light reflected from the subject may be changed by the pixels included in the display 60 while passing through the display 60 so that the image data obtained by capturing the subject may be distorted. Hereinafter, the camera module 10 disposed under the display 60 is referred to as an under display camera (UDC) module.

The IP network module 22 according to some example embodiments of the inventive concepts may be trained to perform at least one of the above-described image processing operations while removing the distortion in the image data generated by the UDC module.

Figure 2:
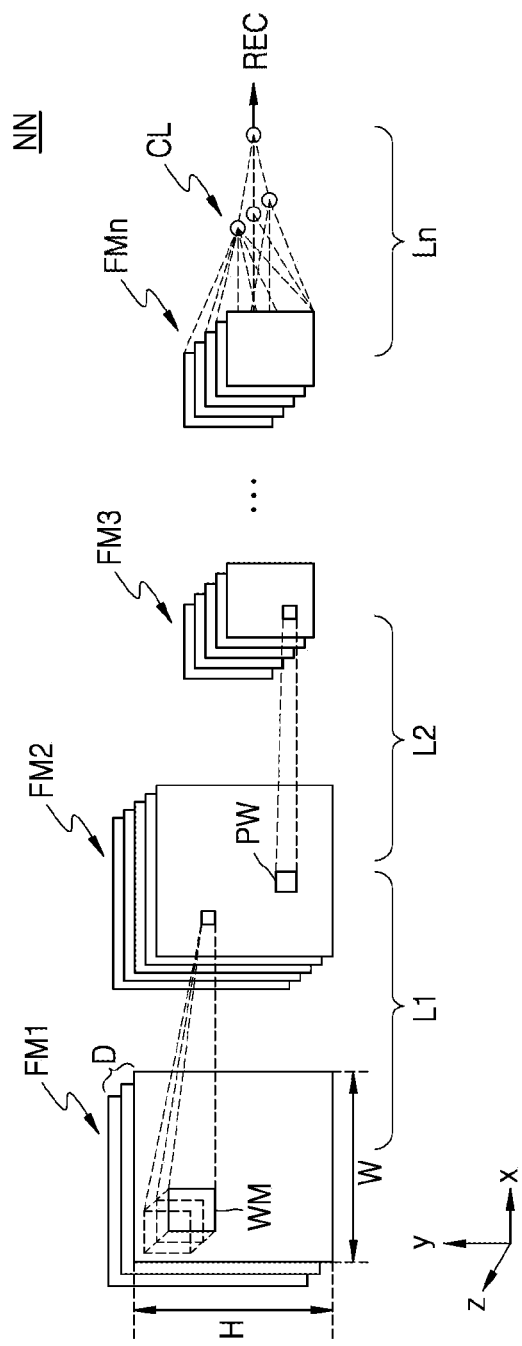
FIG. 2 illustrates an example of a neural network (NN) structure.

FIG. 2 illustrates an example of a neural network (NN) structure. The NN structure of FIG. 2 may be applied to the IP network module 22 of FIG. 1.

Referring to FIG. 2, the NN may include first to nth layers L1 to Ln (n being a positive integer). The NN of the multilayered structure may be referred to as a deep neural network (DNN) or a deep learning architecture. Each of the first to nth layers L1 to Ln may be a linear layer or a non-linear layer. In some example embodiments, at least one layer and at least one non-linear layer may be combined with each other and may be referred to as a layer. For example, the linear layer may include a convolution layer or a fully connected layer and the non-linear layer may include a pooling layer or an activation layer.

For example, the first layer L1 may be the convolution layer, the second layer L2 may be the pooling layer, and the nth layer Ln as an output layer may be the fully connected layer. The NN may further include the activation layer or a layer performing another kind of operation.

Each of the plurality of layers L1 to Ln may receive an input image frame or a feature map generated by a previous layer as an input feature map and may generate an output feature map or a recognition signal REC by operating the input feature map. At this time, the feature map means data in which various features of the input data are expressed.

Each of first to nth feature maps FM1, FM2, FM3, . . . , and FMn may be in a two or three-dimensional matrix (or tensor) including a plurality of feature values. Each of the feature maps FM1, FM2, FM3, . . . , and FMn has a width W (or a column), a height H (or a row), and a depth (D) that may respectively correspond to an x axis, a y axis, and a z axis in coordinates. At this time, the depth D may be referred to as the number of channels.

The first layer L1 may generate the second feature map FM2 by convoluting the first feature map FM1 with a weight map WM. The weight map WM may be in a two or three-dimensional matrix including a plurality of weight values. The weight map WM may be referred to as a kernel. The weight map WM may filter the first feature map FM1 and may be referred to as a filter or the kernel. A depth of the weight map WM, that is, the number of channels, is equal to the depth of the first feature map FM1, that is, the number of channels and the same channels of the weight map WM and the first feature map FM1, may be convoluted with each other. The weight map WM is shifted in a way of traversing by using the first feature map FM1 as a sliding window. During each shift, each of weights included in the weight map WM may be multiplied by and added to all feature values in a region in which the weight map WM overlaps the first feature map FM1. As the first feature map FM1 is convoluted with the weight map WM, one channel of the second feature map FM2 may be generated. In FIG. 2, one weight map WM is displayed. However, actually, a plurality of weight maps are convoluted with the first feature map FM1 so that a plurality of channels of the second feature map FM2 may be generated. That is, the number of channels of the second feature map FM2 may correspond to the number of weight maps.

The second layer L2 may generate the third feature map FM3 by changing a spatial size of the second feature map FM2 through pooling. The pooling may be referred to as sampling or down-sampling. A two-dimensional pooling window PW is shifted on the second feature map FM2 in units of a size of the pooling window PW and a maximum value (or an average value of feature values) may be selected from feature values in a region in which the second feature map FM2 overlaps the pooling window PW. Therefore, the third feature map FM3 of which spatial size is changed may be generated from the second feature map FM2. The number of channels of the third feature map FM3 is equal to the number of channels of the second feature map FM2.

The nth layer Ln may classify a class CL of the input data by combining features of the nth feature map FMn. In addition, the recognition signal REC corresponding to the class CL may be generated.

Figure 3:
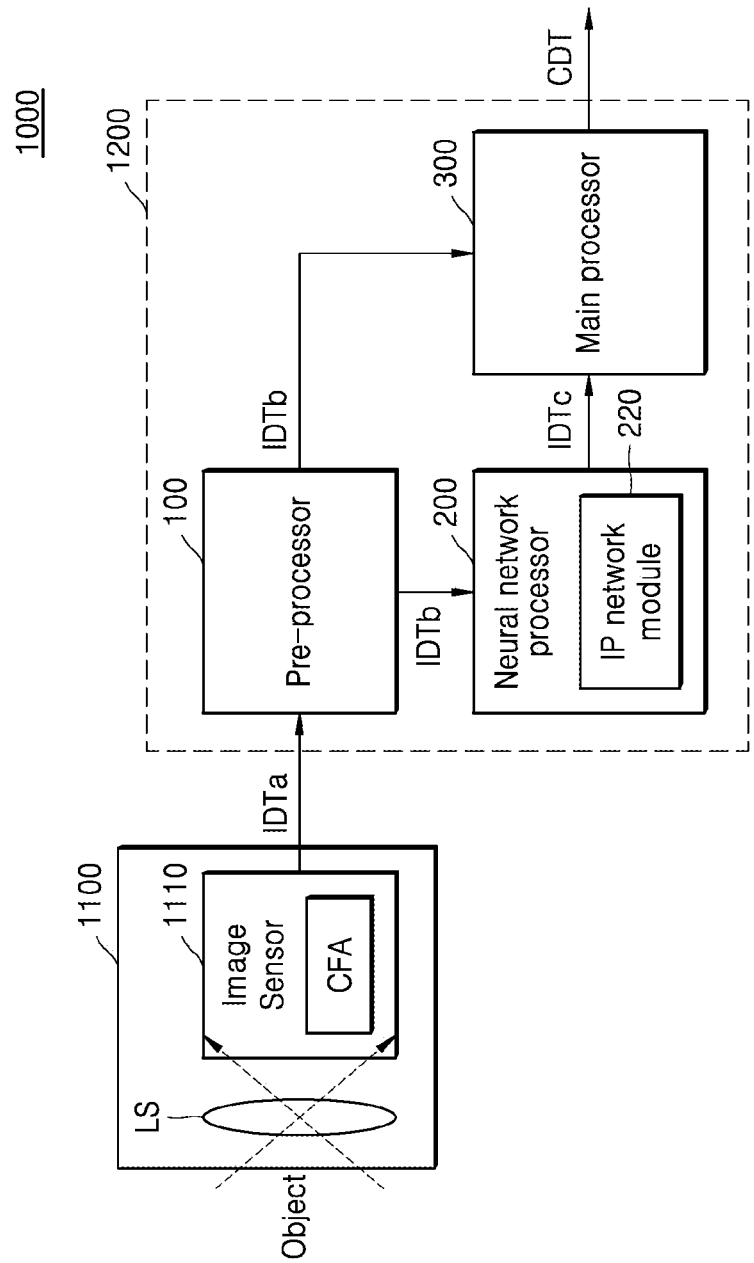
FIG. 3 is a block diagram illustrating an image processing apparatus according to some example embodiments of the inventive concepts.

FIG. 3 is a block diagram illustrating an image processing apparatus 1000 according to some example embodiments of the inventive concepts. In detail, FIG. 3 is a view illustrating some example embodiments in which the neural network system 1 of FIG. 1 is implemented by the image processing apparatus 1000.

The image processing apparatus 1000 may be implemented by an electronic device capturing an image, displaying the captured image, or performing an operation based on the captured image. The image processing apparatus 1000 may be implemented by, for example, a personal computer (PC), an IoT device, or a portable electronic device. The portable electronic device may include a laptop computer, a mobile telephone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device. In addition, the image processing apparatus 1000 may be mounted in an electronic device such as a drone or an ADAS or may be mounted in an electronic device included in a vehicle, furniture, manufacturing equipment, a door, or a measuring device as a part.

Referring to FIG. 3, the image processing apparatus 1000 may include a camera module 1100 (also referred to herein interchangeably as a camera) and an image processing system 1200. The image processing apparatus 1000 may further include other elements such as a user interface. The image processing system 1200 may include a pre-processor 100, a neural network processor 200, and a main processor 300. The camera module 1100 and the neural network processor 200 may respectively correspond to the camera module 10 and the neural network processor 20 of FIG. 1.

Each of the pre-processor 100, the neural network processor 200, and the main processor 300 may be implemented by a single semiconductor chip or a plurality of semiconductor chips. Furthermore, the image processing system 1200 or the image processing apparatus 1000 may be implemented by a SoC. In addition, in FIG. 3, the pre-processor 100 and the main processor 300 are illustrated as being separate from each other, which is only some example embodiments. The pre-processor 100 and the main processor 300 may be implemented by one element.

An image sensor 1110 of the camera module 1100 may include a color filter array (CFA) having a particular (or, alternatively, predetermined) pattern, may convert the optical signal of the subject incident through the optical lens LS into an electrical signal by using the CFA, may generate first image data IDTa based on electrical signals, and may output the generated first image data IDTa. In some example embodiments, the CFA may have a Bayer pattern in which cells each having a 2×2 size and including a red pixel, a blue pixel, and two green pixels are repeatedly arranged. In some example embodiments, the CFA may have a tetra pattern in which cells each having a 4×4 size and including four red pixels, four blue pixels, and eight green pixels are repeatedly arranged. In some example embodiments, the CFA may have a nona pattern in which cells each having a 6×6 size and including nine red pixels, nine blue pixels, and eighteen green pixels are repeatedly arranged. In some example embodiments, the kind of the pattern of the CFA is not limited to the above-described example and the CFA may have a pattern in which cells each having a greater size are repeatedly arranged. Hereinafter, for convenience sake, description will be given assuming that the CFA corresponds to the tetra pattern. However, the inventive concepts are not limited thereto.

The image sensor 1110 may include, for example, a pixel array including a plurality of two-dimensionally arranged pixels and a readout circuit and the pixel array may convert received optical signals into electrical signals. The pixel array may be implemented by, for example, a photoelectric conversion device such as a charge coupled device (CCD) or a complementary metal oxide semiconductor (CMOS) or one of various kinds of photoelectric conversion devices. The readout circuit may generate raw data based on the electrical signal provided by the pixel array and may output the raw data from which noise is removed as the first image data IDTa. The image sensor 1110 may be implemented by a semiconductor chip or a package including the pixel array and the readout circuit.

The pre-processor 100 may perform a pre-processing operation on the first image data IDTa and may generate second image data IDTb based on performing the pre-processing operation on the first image data IDTa. For example, the pre-processing operation that the pre-processor 100 may be configured to perform on the first image data IDTa may include at least one of the BPC operation, the LSC operation, the crosstalk correction operation, or the WB correction operation. In some example embodiments, the inventive concepts are not limited thereto. According to some example embodiments, the pre-processing operation may include the demosaic operation, the denoise operation, and the deblur operation. The pre-processor 100 may transmit second image data IDTb generated by performing the pre-processing operation to the neural network processor 200. The pre-processor 100 may transmit second image data IDTb generated by performing the pre-processing operation to both the neural network processor 200 and the main processor 300.

The neural network processor 200 according to some example embodiments may include an IP network module 220. The IP network module 220 may generate third image data IDTc based on performing at least one image processing operation on the second image data IDTb. As a non-limiting example, the IP network module 220 may be trained to perform at least one of the remosaic operation, the demosaic operation, the denoise operation, the deblur operation, the HDR operation, or the tone mapping operation. The neural network processor 200 may transmit the third image data IDTc to the main processor 300.

The main processor 300 may generate corrected image data CDT based on performing a post-processing operation on the third image data IDTc. The main processor 300 may transmit the generated corrected image data CDT to a display.

The post-processing operation may include an image processing operation complementary to the pre-processing operation. As a non-limiting example, the post-processing operation may include an inverse WB correction operation. In another example, main processor 300 may be configured to perform (e.g., as part of or all of the post-processing operation) at least one of an inverse WB correction operation, a remosaic operation, a demosaic operation, a denoise operation, a deblur operation, a gamma correction operation, an HDR operation, or a tone mapping operation. In addition, the post-processing operation may include a remaining image processing operation excluding the image processing operations performed by the pre-processor 100 and the IP network module 220 among the image processing operations described above in FIG. 1. In this case, the remaining image processing operation performed by the main processor 300 may vary in accordance with kinds of the image processing operations performed by the main processor 300 and the IP network module 220.

In some example embodiments, the IP network module 220 may perform all or a part of the pre-processing operation performed by the pre-processor 100 instead of the pre-processor 100. For example, the IP network module 220 may be trained to perform at least one of the BPC operation, the LSC operation, the crosstalk correction operation, or the WB correction operation. That is, the IP network module 220 may be trained to perform the image processing operation such as the denoise operation as well as the above-described pre-processing operation. When the IP network module 220 performs all the pre-processing operation of the pre-processor 100, the pre-processor 100 may be omitted.

In some example embodiments, the IP network module 220 may perform all or a part of the post-processing operation performed by the main processor 300 instead of the main processor 300. For example, the IP network module 220 may perform the inverse WB correction operation. That is, the IP network module 220 may be trained to perform the image processing operation such as the denoise operation as well as the above-described post-processing operation. When the IP network module 220 performs all the post-processing operation of the main processor 300, the main processor 300 may be omitted.

In some example embodiments, in FIG. 3, it is illustrated that the pre-processor 100, the neural network processor 200, and the main processor 300 perform the image processing operations in the order. However, the inventive concepts are not limited thereto. For example, the neural network processor 200, the pre-processor 100, and the main processor 300 may perform the image processing operations in the order.

In addition, in another example, the image data (for example, the second image data IDTb) processed by the pre-processor 100 may be transmitted to the neural network processor 200 and the main processor 300 and the neural network processor 200 and the main processor 300 may perform the image processing operations in parallel. The neural network processor 200 may transmit the image data (for example, the third image data IDTc) processed by the neural network processor 200 to the main processor 300 and the main processor 300 may merge the image data (for example, the second image data IDTb) processed by the pre-processor 100 with the image data (for example, the third image data IDTc) processed by the neural network processor 200. The main processor 300 may, to perform the post-processing operation, generate fourth image data based on performing a separate post-processing operation on the second image data IDTb and generate the corrected image data CDT based on merging the third image data IDTc with the fourth image data. Said post-processing may be performed at least partially concurrently with the performance of the image processing operation to generate the third image data IDTc.

A detailed operation of the IP network module 220 according to some example embodiments will be described in detail with reference to FIGS. 4A to 4C.

The image processing apparatus 1000 according to some example embodiments of the inventive concepts and/or a portion thereof (e.g., the neural network processor 200) may perform the image processing operations based on using one neural network model trained to perform a plurality of image processing operations. The neural network model may be trained to perform at least one of a remosaic operation, a demosaic operation, a denoise operation, a deblur operation, a gamma correction operation, a high dynamic range (HDR) operation, or a tone mapping operation. In addition, because the neural network model is trained by using the raw image data as the input data, the image processing operations may be performed without converting full resolution of the raw image data into quarter resolution. Therefore, the image processing apparatus 1000 may generate an image with high resolution and high quality.

It will be understood that operations performed by separate processors of the image processing apparatus 1000 and/or trained to be performed by a neural network model used by one or more of the processors of the image processing apparatus 1000 may be similar or different from each other. For example, the neural network model of the neural network processor 200 may be trained to perform a remosaic operation, and the main processor may be configured to perform a remosaic operation that is the same as or different from the remosaic operation that the neural network model is trained to perform.

Figure 4A:
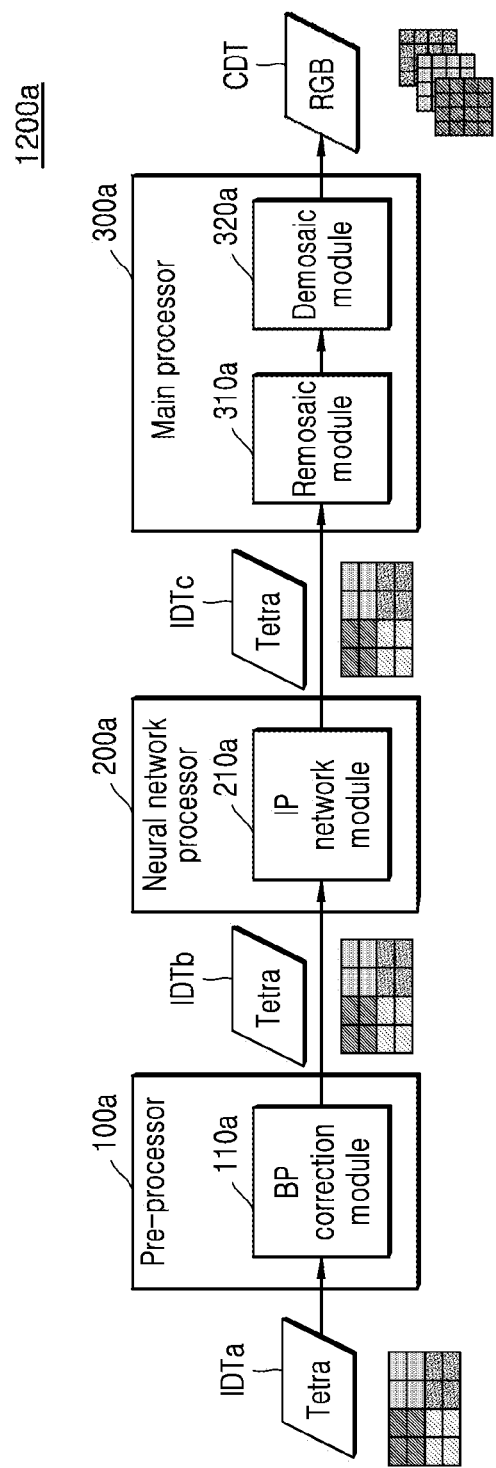
FIGS. 4A, 4B, and 4C are block diagrams describing an operation of a neural network processor according to some example embodiments of the inventive concepts in detail.
Figure 4B:
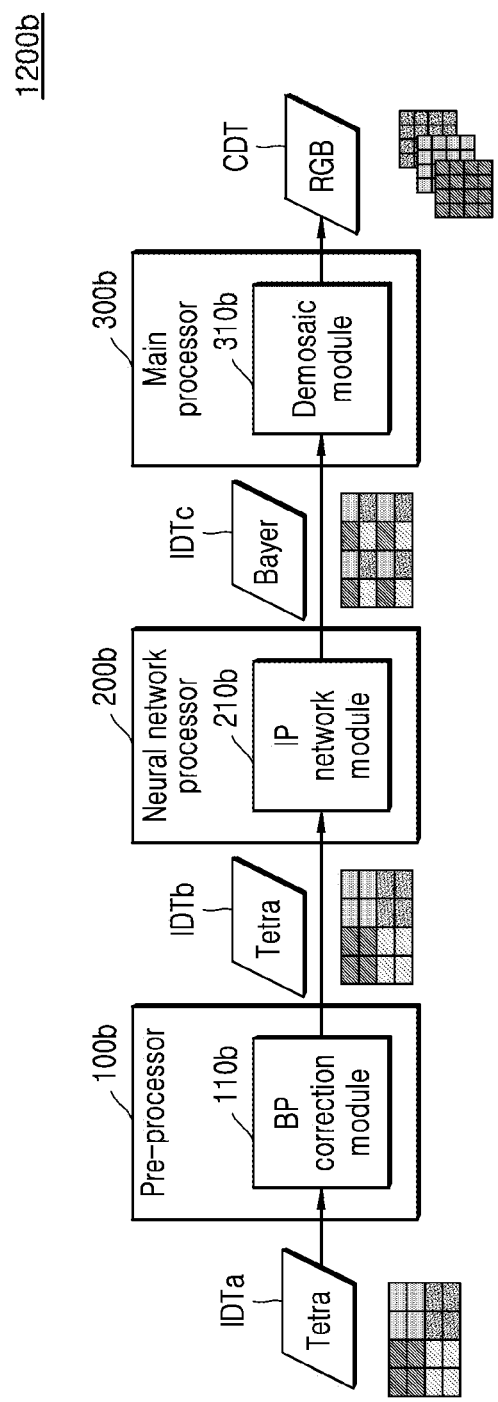
Figure 4C:
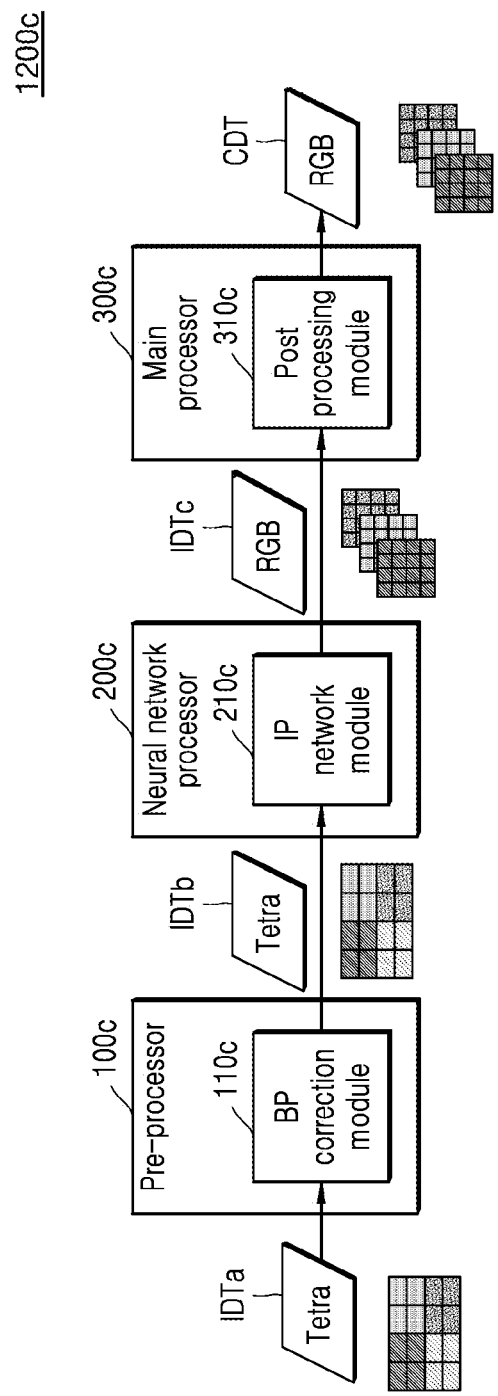

FIGS. 4A to 4C are block diagrams describing an operation of a neural network processor according to some example embodiments of the inventive concepts in detail. Hereinafter, because configurations of the modules illustrated in FIGS. 4A to 4C are only example embodiments, the inventive concepts are not limited thereto and configurations of modules for more pre-processing operations or post-processing operations may be added to image processing systems 1200a, 1200b, and 1200c.

Referring to FIG. 4A, the image processing system 1200a may include a pre-processor 100a, a neural network processor 200a, and a main processor 300a. The pre-processor 100a may include a bad pixel correction (BPC) module 110a. The neural network processor 200a may include an IP network module 210a. The IP network module 210a may be a neural network model trained to perform the denoise operation and the deblur operation. The main processor 300a may include a remosaic module 310a and a demosaic module 320a and thus may be configured to perform a remosaic operation and a demosaic operation.

The pre-processor 100a may receive the tetra type first image data IDTa (hereinafter, referred to as first tetra data) and may generate second tetra data IDTb by performing the pre-processing operation including the BPC operation on the first tetra data IDTa. Specifically, the BPC module 110a may perform the BPC operation of correcting pixel data corresponding to a bad pixel on the first tetra data IDTa.

The neural network processor 200a may receive the second tetra data IDTb from the pre-processor 100a and may perform an image processing operation on the second tetra data IDTb by using the IP network module 210a. Specifically, the IP network module 210a may generate third tetra data IDTc by performing the denoise operation and the deblur operation on the second tetra data IDTb. For example, the IP network module 210a may remove noise and blur from the second tetra data IDTb. According to some example embodiments, because the IP network module 210a does not perform the remosaic operation and the demosaic operation, input and output data of the IP network module 210a is image data in the tetra pattern.

In some example embodiments, the IP network module 210a may be a neural network model trained to perform the above-described denoise and deblur operations and to remove the distortion of the image data generated by, in particular, a UDC module. Therefore, although the first tetra data IDTa is generated by the camera module 1100, that is, the UDC module disposed under the display, the IP network module 210a may generate the third tetra data IDTc by removing the distortion caused by the UDC module in the second tetra data IDTb.

The main processor 300a may receive the third tetra data IDTc from the neural network processor 200a and may generate RGB data IDTd by performing the remosaic operation and the demosaic operation on the third tetra data IDTc. Specifically, the remosaic module 310a may convert the third tetra data IDTc into Bayer data and the demosaic module 320a may convert the Bayer data into RGB data CDT including red, blue, and green channels. In some example embodiments, the inventive concepts are not limited thereto and, according to some example embodiments, the third tetra data IDTc may be converted into YUV data.

Referring to FIG. 4B, the image processing system 1200b may include a pre-processor 100b, a neural network processor 200b, and a main processor 300b. The pre-processor 100*b* may include a BPC module 110*b*. The neural network processor 200*b* may include an IP network module 210*b*. The IP network module 210*b* may be a neural network model trained to perform the denoise operation, the deblur operation, and the remosaic operation. The main processor 300*b* may include a demosaic module 310*b* and thus may be configured to perform a demosaic operation.

The pre-processor 100*b* may receive the tetra type first tetra data IDTa and may generate the second tetra data IDTb by performing the pre-processing operation including the BPC operation on the first tetra data IDTa. Specifically, the BPC module 110*b* may perform the BPC operation of correcting pixel data corresponding to a bad pixel on the first tetra data IDTa.

The neural network processor 200*b* may receive the second tetra data IDTb from the pre-processor 100*b* and may perform an image processing operation on the second tetra data IDTb by using the IP network module 210*b*. Specifically, the IP network module 210*b* may generate Bayer data IDTc by performing the denoise operation, the deblur operation, and the remosaic operation on the second tetra data IDTb. For example, the IP network module 210*b* may remove noise and blur from the second tetra data IDTb and may convert the second tetra data IDTb into image data in the Bayer pattern. According to some example embodiments, because the IP network module 210*b* does not perform the remosaic operation and the demosaic operation, input and output data of the IP network module 210*b* is image data in the tetra pattern.

In some example embodiments, the IP network module 210*b* may be a neural network model trained to perform the above-described denoise, deblur, and remosaic operations and to remove the distortion of the image data generated by, in particular, a UDC module. Therefore, although the first tetra data IDTa is generated by the camera module 1100, that is, the UDC module disposed under the display, the IP network module 210*b* may generate Bayer data IDTc by removing the distortion caused by the UDC module in the second tetra data IDTb.

The main processor 300*b* may receive the Bayer data IDTc from the neural network processor 200*b* and may generate RGB data CDT by performing the demosaic operation on the Bayer data IDTc. Specifically, the demosaic module 310*b* may convert the Bayer data IDTc into the RGB data CDT. In some example embodiments, the inventive concepts are not limited thereto and, according to some example embodiments, the Bayer data IDTc may be converted into YUV data.

Referring to FIG. 4C, the image processing system 1200*c* may include a pre-processor 100*c*, a neural network processor 200*c*, and a main processor 300*c*. The pre-processor 100*c* may include a BPC module 110*c*. The neural network processor 200*c* may include an IP network module 210*c*. The IP network module 210*c* may be a neural network model trained to perform the denoise operation, the deblur operation, the remosaic operation, and the demosaic operation. The main processor 300*c* may include a post-processing module 310*c*.

The pre-processor 100*c* may receive the tetra type first tetra data IDTa and may generate the second tetra data IDTb by performing the pre-processing operation including the BPC operation on the first tetra data IDTa. Specifically, the BPC module 110*c* may perform the BPC operation of correcting pixel data corresponding to a bad pixel on the first tetra data IDTa.

The neural network processor 200*c* may receive the second tetra data IDTb from the pre-processor 100*c* and may perform an image processing operation on the second tetra data IDTb by using the IP network module 210*c*. Specifically, the IP network module 210*c* may generate first RGB data IDTc by performing the denoise operation, the deblur operation, the remosaic operation, and the demosaic operation on the second tetra data IDTb. For example, the IP network module 210*c* may remove noise and blur from the second tetra data IDTb, may convert the second tetra data IDTb into image data in the Bayer pattern, and may convert the image data in the Bayer pattern into RGB data. In some example embodiments, the inventive concepts are not limited thereto and, according to some example embodiments, the second tetra data IDTb may be converted into YUV data. According to some example embodiments, because the IP network module 210*c* performs the remosaic operation and the demosaic operation, input data of the IP network module 210*c* is image data in the tetra pattern and output data is image data having RGB channels (or YUV channels).

In some example embodiments, the IP network module 210*c* may be a neural network model trained to perform the above-described denoise, deblur, remosaic, and demosaic operations and to remove the distortion of the image data generated by, in particular, a UDC module. Therefore, although the first tetra data IDTa is generated by the camera module 1100, that is, the UDC module disposed under the display, the IP network module 210*c* may generate RGB data IDTc by removing the distortion caused by the UDC module in the second tetra data IDTb.

The main processor 300*c* may receive the first RGB data IDTc from the neural network processor 200*c* and may generate second RGB data CDT by performing the post-processing operation on the first RGB data IDTc. Specifically, the post-processing module 310*c* may generate the second RGB data CDT by performing the inverse WB correction operation on the first RGB data IDTc, the HDR operation of merging a plurality of images so as to have a wide illumination range, and the tone mapping operation of converting an HDR image to be suitable for a display. In some example embodiments, kinds of the post-processing operations performed by the post-processing module 310*c* are not limited to the above-described example.

In some example embodiments, in FIGS. 4A to 4C, it is illustrated that the pre-processors 100*a*, 100*b*, and 100*c* include only the BPC modules 110*a*, 110*b*, and 110*c*. However, the inventive concepts are not limited thereto. For example, the pre-processors 100*a*, 100*b*, and 100*c* may further include separate modules performing the LSC operation of correcting brightness of an image, the crosstalk correction operation of correcting a sensitivity difference among green pixels, and the WB correction operation of controlling color balance.

In addition, in FIGS. 4A to 4C, it is illustrated that the main processors 300*a* and 300*b* include only the remosaic module and/or the demosaic module. However, the inventive concepts are not limited thereto. For example, the main processors 300*a* and 300*b* may further include separate modules performing the inverse WB correction operation, the HDR operation of merging a plurality of images so as to have a wide illumination range, and the tone mapping operation of converting an HDR image to be suitable for a display.

Figure 5:
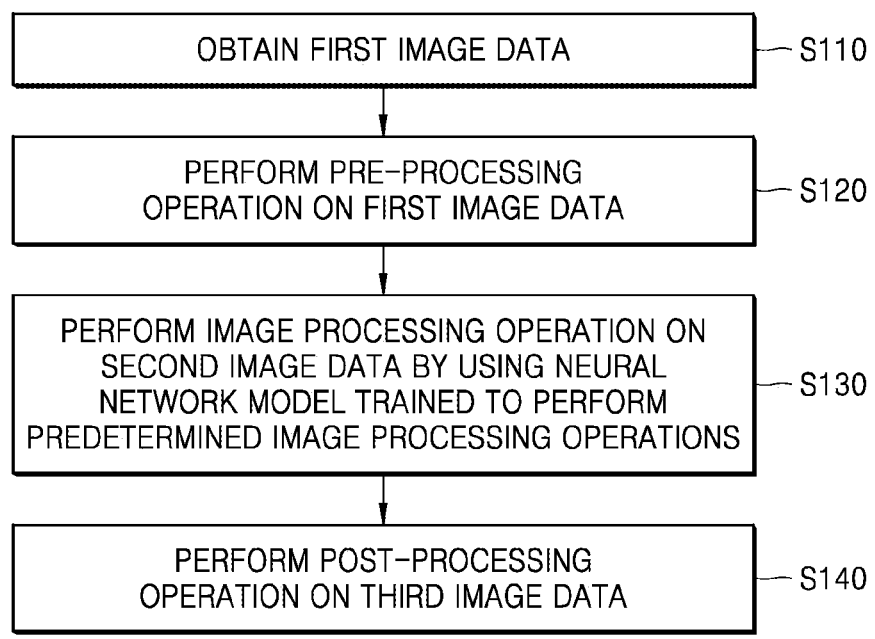
FIG. 5 is a flowchart illustrating a method of operating an image processing apparatus according to some example embodiments of the inventive concepts.

FIG. 5 is a flowchart illustrating a method of operating an image processing apparatus according to some example embodiments of the inventive concepts. In detail, FIG. 5 is a flowchart illustrating a method of operating the image processing systems 1200, 1200*a*, 1200*b*, and 1200*c* described above with reference to FIGS. 3 to 4C. Hereinafter, for convenience sake, the operation of the image processing system 1200 is described. However, the description may also be applied to the image processing systems 1200a, 1200b, and 1200c. It will be understood that the operations described with reference to FIG. 5 may be performed by any of the image processing apparatuses according to any of the example embodiments. It will also be understood that the order of the operations shown in FIG. 5 may be adjusted, including causing at least some of the operations to be performed at least partially concurrently (e.g., in parallel). One or more of the operations shown in FIG. 5 may be omitted from a method of operating an image processing system according to some example embodiments, and one or more additional operations not shown in FIG. 5 may be added to the method.

Referring to FIG. 5, the image processing system 1200 may obtain the first image data in operation S110. For example, the image processing system 1200 may obtain the first image data generated by the camera module 1100. The first image data may be received from the camera module 1100 or may be obtained from memory. The first data may have one of various patterns such as the Bayer pattern, the tetra pattern, and/or the nona pattern.

The image processing system 1200 or a portion thereof (e.g., the pre-processor 100) may perform the pre-processing operation on the first image data in operation S120. Specifically, the image processing system 1200 may generate the second image data by (e.g., based on) performing a pre-processing operation that may include one or more of the pre-processing operations including the BPC operation, the LSC operation, the crosstalk correction operation, and/or the WB correction operation on the first image data. In some example embodiments, the kinds of the pre-processing operations are not limited to the above-described example and the pre-processing operations may include various image processing operations such as the demosaic operation, the denoise operation, and the deblur operation.

The image processing system 1200 or a portion thereof (e.g., the neural network processor 200) may perform the image processing operation on the second image data based on using a neural network model learned (e.g., trained) to perform one or more particular (or, alternatively, predetermined) image processing operations. Specifically, the image processing system 1200 may generate the third image data by performing the image processing operation on the second image data by using the IP network module 220 trained to perform at least one of the remosaic operation, the demosaic operation, the denoise operation, the deblur operation, the HDR operation, or the tone mapping operation. In some example embodiments, the IP network module 220 may be a neural network model trained to perform the above-described image processing operations and to remove the distortion of the image data generated by a UDC module. Restated, the IP network module 220 may be a neural network model that is trained to perform at least operation S130 on image data generated by the UDC module.

A kind of the input data (that is, the second image data) of the IP network module 220 may vary in accordance with a kind of the image data generated by the camera module 1100. For example, when the camera module 1100 generates the image data in the Bayer pattern, the image data in the Bayer pattern may be input to the IP network module 220 as the input data. In addition, when the camera module 1100 generates the image data in the tetra or nana pattern, the image data in the tetra or nana pattern may be input to the IP network module 220 as the input data.

A kind of the output data (that is, the third image data) of the IP network module 220 may vary in accordance with an implementation example of the IP network module 220. For example, when the IP network module 220 is trained to perform the remosaic operation and the demosaic operation, the RGB data may be output as the output data. In some example embodiments, when the IP network module 220 is trained to perform the remosaic operation, the image data in the Bayer pattern may be output as the output data. In some example embodiments, when the IP network module 220 is trained to perform the image processing operation excluding the remosaic operation and the demosaic operation, the output data that is of the same kind as image data generated by the camera module 1100 may be output. The neural network model used by an IP network module to generate third image data based on performing an image processing operation on second image data may include image data having a tetra pattern in which pixels having one of reference colors are repeatedly arranged in 4 by 4 matrix or a nona pattern in which pixels having one of the reference colors are repeatedly arranged in 6 by 6 matrix as input data and uses image data having a Bayer pattern or RGB image data as output data.

The image processing system 1200 may perform the post-processing operation on the third image data in operation S140. Specifically, the image processing system 1200 and/or a portion thereof (e.g., the main processor 300) may generate fourth image data based on performing an image processing operation complementary to the pre-processing operation (for example, the inverse WB correction operation) on the third image data or the post-processing operation including an image processing operation that is not performed in operation S110 and S120. For example, performing the post-processing operation at S140 may include generating, fourth image data (e.g., at the main processor of an image processing apparatus, and in parallel or concurrently with at least S130 being performed) based on performing a separate post-processing operation on the second image data generated at S110 and further generating the corrected image data based on merging the third image data generated at S130 with the fourth image data.

Figure 6:
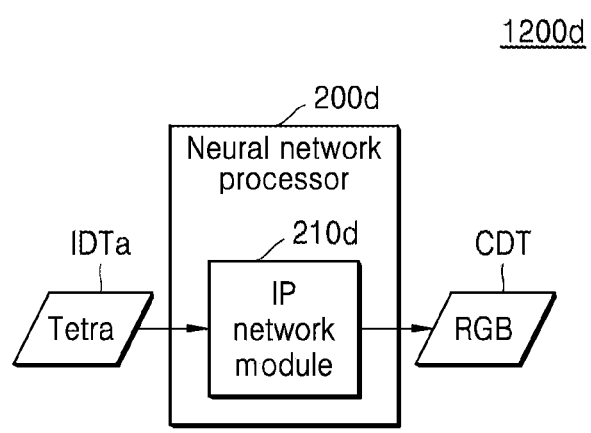
FIG. 6 is a block diagram describing an operation of a neural network processor according to some example embodiments of the inventive concepts in detail.

FIG. 6 is a block diagram describing an operation of a neural network processor according to some example embodiments of the inventive concepts in detail.

Referring to FIG. 6, an image processing system 1200d may include a neural network processor 200d. The neural network processor 200d may include an IP network module 210d. In comparison with FIGS. 4A to 4C, the neural network processor 200d may generate RGB data CDT by performing all the image processing operations including the pre-processing operation and the post-processing operation on tetra data IDTa. That is, the IP network module 210d may be a neural network model trained to perform all the image processing operations. Therefore, the neural network processor 200d may replace all the operations of the pre-processors 100a, 100b, and 100c and the main processors 300a, 300b, and 300c of FIGS. 4A to 4C.

Figure 7:
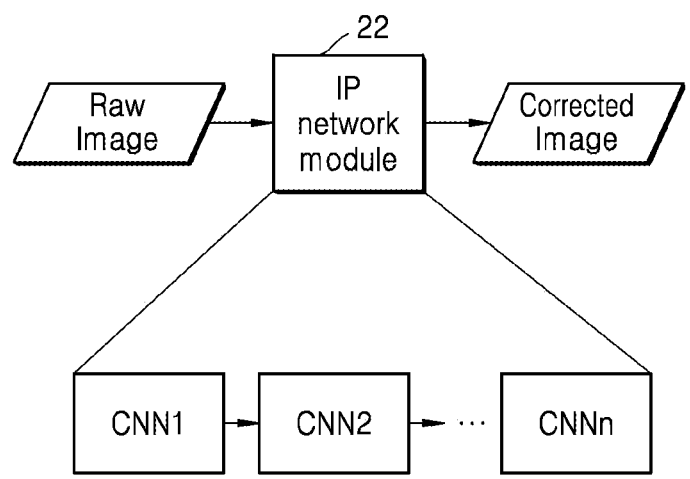
FIG. 7 is a view illustrating an image processing network module according to some example embodiments of the inventive concepts.

FIG. 7 is a view illustrating an IP network module according to some example embodiments of the inventive concepts. In detail, FIG. 7 is a view illustrating the IP network module 22 of FIG. 1. In some example embodiments, description of FIG. 7 may also be applied to the IP network modules 210a, 210b, 210c, and 210d of FIGS. 3 to 4C and 6.

Referring to FIG. 7, the IP network module 22 may perform a particular (or, alternatively, predetermined) image processing operation by using the raw image as the input data and may generate a corrected image as a result of performing the particular (or, alternatively, predetermined) image processing operation.

In some example embodiments, the IP network module 22 may be learned (e.g., a neural network model used by the IP network module 22 may be trained) based on using the image (e.g., raw image) generated by the UDC module as the input data and by using the corrected image obtained by removing the distortion in the input data as the output data. The neural network model may be trained based on using an image generated by the UDC module (said image being referred to herein interchangeably as first trained data) as input data and using a corrected image obtained based on performing one or more particular (or, alternatively, predetermined) image processing operations on the "first trained data" as output data (said corrected image being referred to herein interchangeably as second trained data). The raw image generated by the UDC module may include distortions such as blur, ghost, haze, and flare. Therefore, the IP network module 22 may be trained to perform the remosaic operation, the demosaic operation, the denoise operation, and the deblur operation while processing the distortions included in the raw image.

In some example embodiments, the IP network module 22 may be learned by using additional information as well as the raw image as the input data. For example, the IP network module 22 may be learned to generate the corrected image by using the raw image, bad pixel information, and noise level measurement information as the input data.

In some example embodiments, the IP network module 22 may include a plurality of neural network modules CNN1, CNN2, ..., and CNNn, where "n" is a positive integer. For example, the IP network module 22 may include the plurality of neural network modules CNN1, CNN2, ..., and CNNn respectively corresponding to the plurality of image processing operations or corresponding to a combination of the plurality of image processing operations. In some example embodiments, in FIG. 7, it is illustrated that the plurality of neural network modules CNN1, CNN2, ..., and CNNn are CNN models, which is only some example embodiments. The inventive concepts are not limited thereto. For example, the IP network module 22 may include a plurality of CNN models and ANN models.

In some example embodiments, the IP network module 22 may be previously learned by a manufacturer and may be included while manufacturing the image processing system 1200. Specifically, the IP network module 22 learned based on the raw image and the corrected image collected by the plurality of image processing systems 1200 by the manufacturer may be included while manufacturing the image processing system 1200.

Figure 8A:
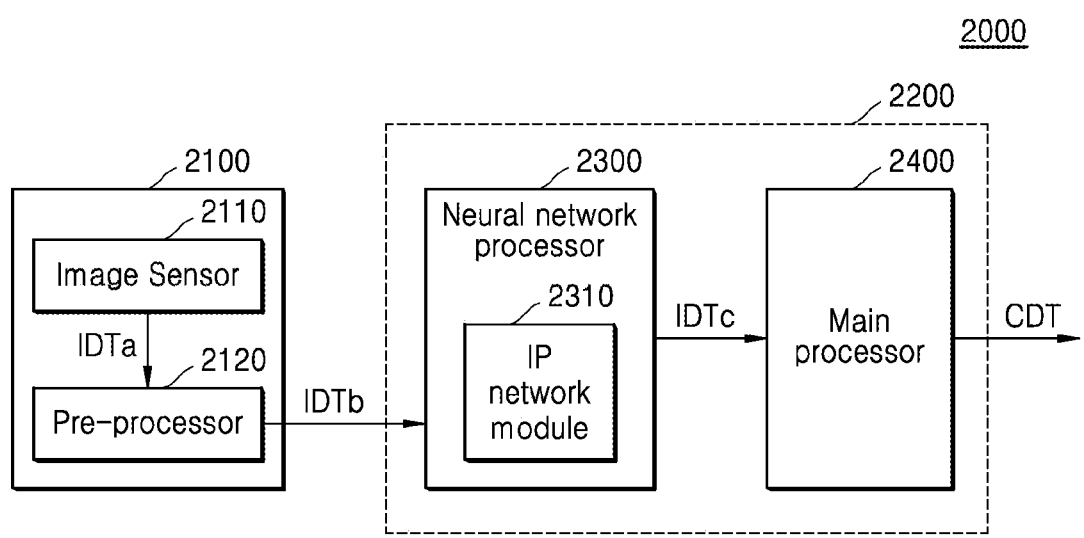
FIGS. 8A, 8B, and 8C are block diagrams illustrating an image processing apparatus according to some example embodiments of the inventive concepts.
Figure 8B:
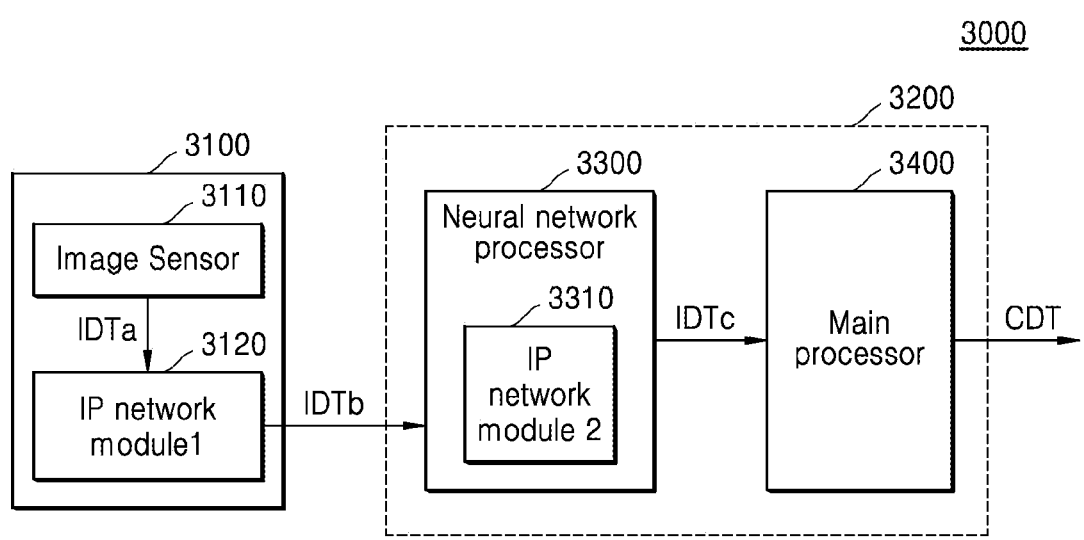
Figure 8C:
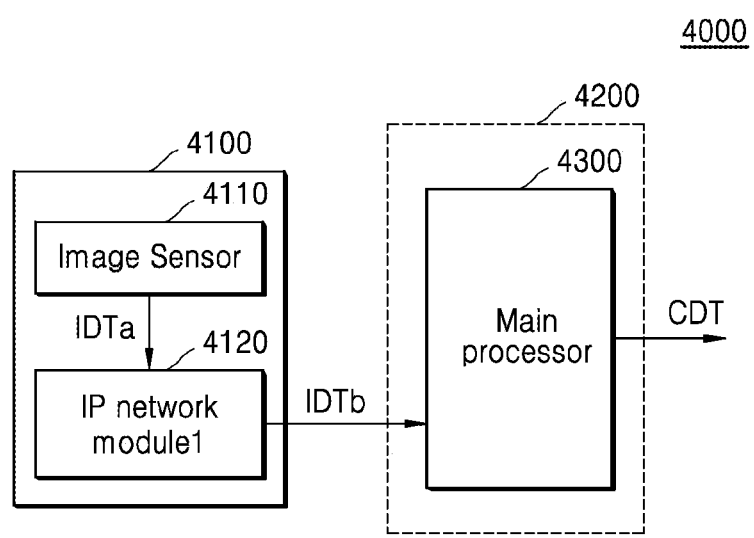

FIGS. 8A to 8C are block diagrams illustrating an image processing apparatus 2000 according to some example embodiments of the inventive concepts. In detail, FIGS. 8A to 8C are views illustrating modifiable embodiments of the image processing apparatus 1000 of FIG. 3.

Referring to FIG. 8A, the image processing apparatus 2000 may include a camera module 2100 and an image processing system 2200. The camera module 2100 may include an image sensor 2110 and a pre-processor 2120. The image processing system 2200 may include a neural network processor 2300 and a main processor 2400. The neural network processor 2300 may include an IP network module 2310.

In comparison with the image processing apparatus 1000 of FIG. 3, the image processing apparatus 2000 of FIG. 8A may include the pre-processor 2120 in the camera module 2100. The pre-processor 2120 may generate the second image data IDTb by performing the pre-processing operation on the first image data IDTa generated by the image sensor 2110. The pre-processor 2120 may transmit the second image data IDTb to the neural network processor 2300. Because description of the pre-processing operation may be actually the same as the description given with reference to FIG. 3, previously given description is omitted.

The neural network processor 2300 according to some example embodiments may generate the third image data IDTc by performing at least one image processing operation on the second image data IDTb received by the IP network module 2310. The neural network processor 2300 may transmit the third image data IDTc to the main processor 2400. Because description of the IP network module 2310 may be actually the same as the description given with reference to FIG. 3, previously given description is omitted.

The main processor 2400 according to some example embodiments may generate the corrected image data CDT by performing the post-processing operation on the third image data IDTc. The main processor 2400 may transmit the corrected image data CDT to a display. Because description of the post-processing operation may be actually the same as the description given with reference to FIG. 3, previously given description is omitted.

Referring to FIG. 8B, the image processing apparatus 3000 may include a camera module 3100 and an image processing system 3200. The camera module 3100 may include an image sensor 3110 and a first IP network module 3120. The image processing system 3200 may include a neural network processor 3300 and a main processor 3400. The neural network processor 3300 may include a second IP network module 3310.

In comparison with the image processing apparatus 2000 of FIG. 8A, in the image processing apparatus 3000 of FIG. 8B, the first IP network module 3120 may be included in the camera module 3100 and the second IP network module 3310 may be included in the neural network processor 3300. The first IP network module 3120 is a neural network model implemented to perform some of a function of the pre-processor 2120 of FIG. 8A and functions of the IP network module 2310 of FIG. 8A. Restated, the first IP network module 3120 may be understood to be a first neural network processor, and the neural network processor 3300 may be understood to be a second neural network processor.

For example, the first IP network module 3120 may be implemented to perform some of the demosaic operation, the denoise operation, and the deblur operation together with the pre-processing operations such as the BPC operation, the LSC operation, the crosstalk correction operation, and the WB correction operation. In some example embodiments, although not shown in FIG. 8B, the camera module 3100 may include a processing unit (for example, a neural network processor) executing the first IP network module 3120.

The first IP network module 3120 may generate the second image data IDTb by performing the image processing operation on the first image data IDTa generated by the image sensor 3110. The first IP network module 3120 may transmit the second image data IDTb to the neural network processor 3300.

The neural network processor 3300 according to some example embodiments may generate the third image data IDTc by performing at least one image processing operation on the second image data IDTb received by the second IP network module 3310. The second IP network module 3310 is a neural network model implemented to perform some of the functions of the IP network module 2310 of FIG. 8A and may be implemented to perform an image processing operation that is not performed by the first IP network module 3120. The neural network processor 3300 may transmit the third image data IDTc to the main processor 3400. Accordingly, it will be understood that the neural network model implemented by a neural network processor of the image processing apparatus 3000 may include a first neural network model that is, is included in, and/or is implemented by the first IP network module 3120 and is configured to perform first image processing operations, and the neural network model may further include a second neural network model, that is, is included in, and/or is implemented by the second IP network module 3310 and is configured to perform second image processing operations that may be same or different from the first image processing operations. The neural network processor of the image processing apparatus 3000 may include a first neural network processor, which may include and/or implement the first IP network module 3120 and may be configured to execute the first neural network module, and a second neural network processor, which may include and/or implement the second IP network module 3310, where the first neural network processor is included in the camera module 3100.

The main processor 3400 according to some example embodiments may generate the corrected image data CDT by performing the post-processing operation on the third image data IDTc. The main processor 3400 may transmit the corrected image data CDT to a display. Because description of the post-processing operation may be actually the same as the description given with reference to FIG. 3, previously given description is omitted.

In some example embodiments, the inventive concepts are not limited thereto and the first IP network module 3120 may be a neural network model implemented to perform some of the functions of the IP network module 2310 of FIG. 8A without performing the function of the pre-processor 2120. In this case, the pre-processor 2120 of FIG. 8A may be included in the camera module 3100 and the first IP network module 3120 may process the image data received from the pre-processor 2120.

Referring to FIG. 8C, the image processing apparatus 4000 may include a camera module 4100 and an image processing system 4200. The camera module 4100 may include an image sensor 4110 and an IP network module 4120. The image processing system 4200 may include a main processor 4300. The camera module 4100 may include an IP network module 4120.

In comparison with the image processing apparatus 2000 of FIG. 8A, in the image processing apparatus 4000 of FIG. 8C, the IP network module 4120, and thus a neural network processor of the image processing apparatus as described herein, may be included in the camera module 4100. The IP network module 4120 is a neural network model implemented to perform all of the function of the pre-processor 2120 of FIG. 8A and the functions of the IP network module 2310 of FIG. 8A. For example, the IP network module 4120 may be implemented to perform all of the demosaic operation, the denoise operation, and the deblur operation together with the pre-processing operations such as the BPC operation, the LSC operation, the crosstalk correction operation, and the WB correction operation. In some example embodiments, although not shown in FIG. 8C, the camera module 4100 may include a processing unit (for example, a neural network processor) executing the IP network module 4120.

The IP network module 4120 may generate the second image data IDTb by performing the image processing operation on the first image data IDTa generated by the image sensor 4110. The IP network module 4120 may transmit the second image data IDTb to the main processor 4300.

The main processor 4300 according to some example embodiments may generate the corrected image data CDT by performing the post-processing operation on the second image data IDTb. The main processor 4300 may transmit the corrected image data CDT to a display. Because description of the post-processing operation may be actually the same as the description given with reference to FIG. 3, previously given description is omitted.

In some example embodiments, the inventive concepts are not limited thereto and the IP network module 4120 may be a neural network model implemented to perform all of the functions of the IP network module 2310 of FIG. 8A without performing the function of the pre-processor 2120. In this case, the pre-processor 2120 of FIG. 8A may be included in the camera module 4100 and the IP network module 4120 may process the image data received from the pre-processor 2120.

As described above, the image processing apparatuses 2000, 3000, and 4000 according to the inventive concepts may be implemented so that at least some of the functions of the pre-processor 100 and/or the IP network module 220 of FIG. 3 are performed by the camera modules 2100, 3100, and 4100.

Figure 9:
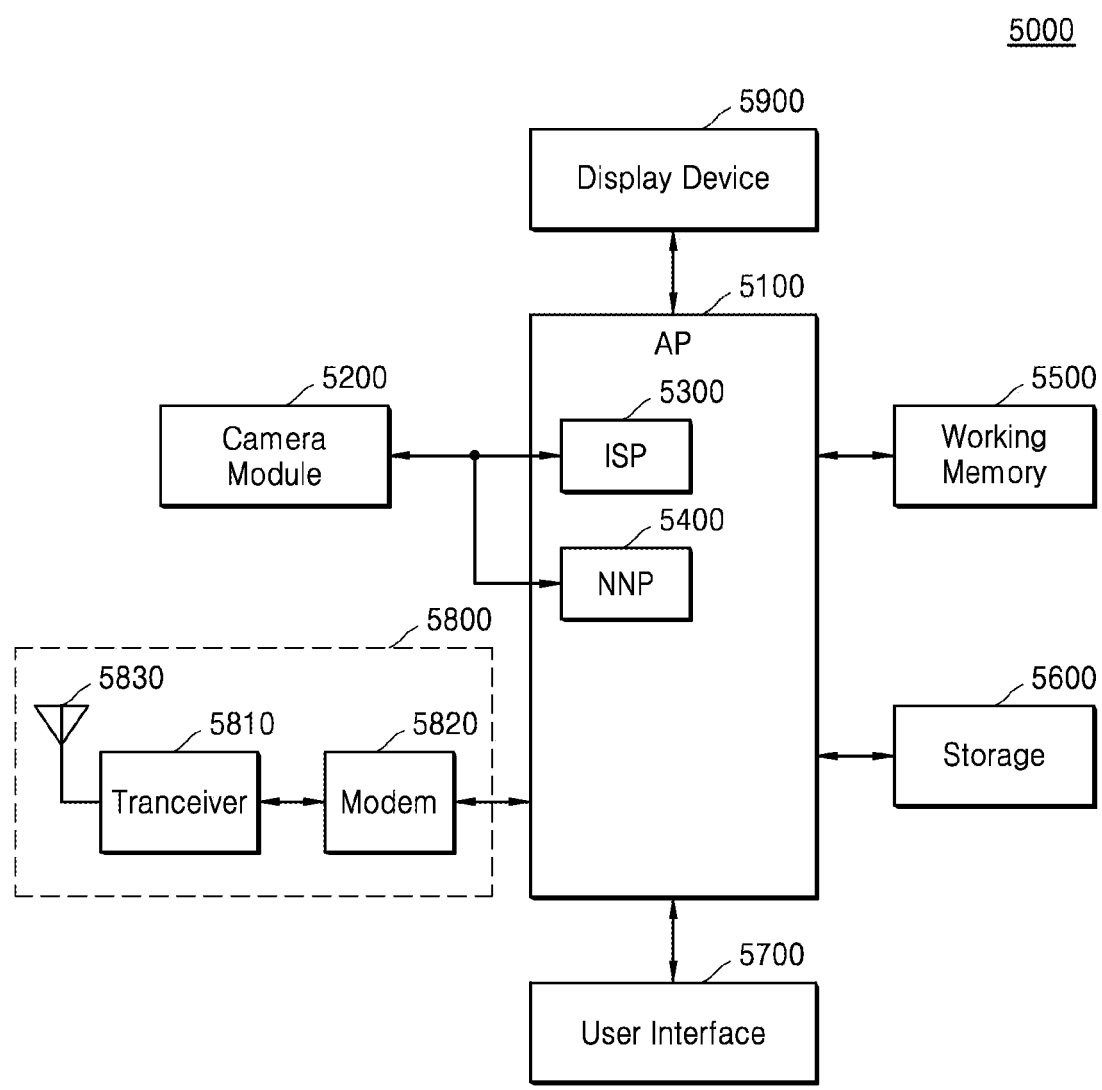
FIG. 9 is a block diagram illustrating an electronic device according to some example embodiments of the inventive concepts.

FIG. 9 is a block diagram illustrating an electronic device 5000 according to some example embodiments of the inventive concepts. For example, the electronic device 5000 may be a portable terminal.

Referring to FIG. 9, the electronic device 5000 according to some example embodiments of the inventive concepts may include an application processor 5100, a camera module 5200, working memory 5500, a storage 5600, a user interface 5700, a wireless transceiver 5800, and a display device 5900 (also referred to herein interchangeably as a display) and the application processor 5100 may include an image signal processor 5300 and a neural network processor 5400. The image processing operations according to some example embodiments of the inventive concepts, which are described with reference to FIG. 1, may be applied to the image signal processor 5300 and the neural network processor 5400. According to some example embodiments, the image signal processor 5300 and the neural network processor 5400 may be implemented by an integrated circuit separate from the application processor 5100.

The application processor 5100 may be provided as a SoC controlling an overall operation of the electronic device 5000 and driving an application program and an operating system (OS). The application processor 5100 may control an operation of the image signal processor 5300 and may provide image data generated by the image signal processor 5300 to the display device 5900 or the storage 5600.

The camera module 5200 may generate image data, for example, raw image data based on a received optical signal and may provide the image data to the image signal processor 5300.

The working memory 5500 may be implemented by volatile memory such as DRAM or SRAM or non-volatile resistive memory such as FeRAM, RRAM, or PRAM. The working memory 5500 may store programs and/or data processed or executed by the application processor 5100.

The storage 5600 may be implemented by non-volatile memory such as NAND flash or resistive memory and, for example, the storage 5600 may be provided as a memory card such as a multimedia card (MMC), an embedded MMC (eMMC), a secure digital (SD) card, or a micro SD card. The storage 5600 may store data and/or an execution algorithm controlling an image processing operation of the image signal processor 5300 and, when the image processing operation is performed, the data and/or program may be loaded on the working memory 5500. According to some example embodiments, the storage 5600 may store image data generated by the image signal processor 5300, for example, converted image data or post-processed image data.

The user interface 5700 may be implemented by one of various devices capable of receiving a user input such as a key pad, keyboard, a switch, a curtain key panel, a touch panel, a fingerprint sensor, and a microphone. The user interface 5700 may receive a user input and may provide a signal corresponding to the received user input to the application processor 5100. The wireless transceiver 5800 may include a transceiver 5810, a modem 5820, and an antenna 5830.

In some example embodiments, some or all of the apparatuses, systems, electronic devices and/or elements thereof as described herein with reference to any of the drawings (including without limitation the elements of the neural network system 1, any of the image processing apparatuses 1000, 1200a-1200d, IP network module 22, image processing apparatus 2000-4000, electronic device 5000, or the like) and/or any portions thereof (including without limitation any blocks, modules, processors, cameras, or the like) may include, may be included in, and/or may be implemented by one or more instances of processors such as hardware including logic circuits; a hardware/software combination such as a processor executing software; or a combination thereof. For example, a processor as described herein more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, a processor may include a non-transitory computer readable storage device, for example a solid state drive (SSD), storing a program of instructions, and an instance of processor hardware, for example a CPU, configured to execute the program of instructions to implement the functionality and/or methods performed by some or all of any apparatus, system, and/or element according to any of the example embodiments (including without limitation any portion, block, module, processor, camera, or the like of any apparatus, system, and/or element according to any of the example embodiments), including for example any of the methods according to any of the example embodiments, including the method shown in FIG. 5 and the operations shown in FIGS. 4A-4C.

While the inventive concepts have been particularly shown and described with reference to some example embodiments thereof, it will be understood that various changes in form and details may be made therein without departing from the spirit and scope of the following claims.

What is claimed is:

1. An image processing apparatus, comprising:
a camera configured to generate first image data;
a pre-processor configured to generate second image data based on performing a pre-processing operation on the first image data;
a neural network processor configured to generate third image data based on performing an image processing operation on the second image data based on using a neural network model trained to perform one or more particular image processing operations; and
a main processor configured to generate corrected image data based on performing a post-processing operation on the third image data,
wherein the pre-processor is configured to transmit the second image data to both the neural network processor and the main processor, and
wherein the main processor is configured to
generate fourth image data based on performing a separate post-processing operation on the second image data, and
generate the corrected image data based on merging the third image data with the fourth image data.

2. The image processing apparatus of claim 1, wherein the pre-processor is configured to perform at least one of a bad pixel correction (BPC) operation, a lens shading correction (LSC) operation, a crosstalk correction operation, or a white balance (WB) correction operation.

3. The image processing apparatus of claim 2, wherein the neural network model is trained to perform at least one of a remosaic operation, a demosaic operation, a denoise operation, a deblur operation, a gamma correction operation, a high dynamic range (HDR) operation, or a tone mapping operation.

4. The image processing apparatus of claim 3, wherein the main processor is configured to perform at least one of an inverse WB correction operation, a remosaic operation, a demosaic operation, a denoise operation, a deblur operation, a gamma correction operation, an HDR operation, or a tone mapping operation.

5. The image processing apparatus of claim 4, wherein
the neural network model is trained to perform a denoise operation and a deblur operation, and
the main processor is configured to perform a remosaic operation and a demosaic operation.

6. The image processing apparatus of claim 4, wherein
the neural network model is trained to perform a denoise operation, a deblur operation, and a remosaic operation, and
the main processor is configured to perform a demosaic operation.

7. The image processing apparatus of claim 1, wherein
the neural network model uses image data having a tetra pattern in which pixels having one of reference colors are repeatedly arranged in 4 by 4 matrix, or a nona pattern in which pixels having one of the reference colors are repeatedly arranged in 6 by 6 matrix as input data, and
the neural network model uses image data having a Bayer pattern or RGB image data as output data.

8. The image processing apparatus of claim 1, further comprising:
a display configured to display an image,
wherein the camera is an under display camera located under the display and the under display camera is configured to generate the first image data.

9. The image processing apparatus of claim 8, wherein the neural network model is trained based on
using first trained data generated by the under display camera as input data, and
using second trained data obtained based on performing the one or more particular image processing operations on the first trained data as output data.

10. The image processing apparatus of claim 1, wherein the neural network model includes at least one of an artificial neural network (ANN) model or a convolution neural network (CNN) model.

11. The image processing apparatus of claim 1, wherein the pre-processor is included in the camera.

12. The image processing apparatus of claim 11, wherein the neural network model includes
   a first neural network model configured to perform first image processing operations, and
   a second neural network model configured to perform second image processing operations,
the neural network processor includes
   a first neural network processor configured to execute the first neural network model, and
   a second neural network processor configured to execute the second neural network model, and
the first neural network processor is included in the camera.

13. The image processing apparatus of claim 1, wherein the neural network processor is included in the camera.

14. An image processing apparatus, comprising:
a display;
an under display camera located under the display, the under display camera configured to generate first image data capturing an image of an exterior environment that is external to the image processing apparatus;
a neural network processor configured to perform an image processing operation on the first image data based on using a neural network model trained to perform the image processing operation on image data generated by the under display camera;
a pre-processor configured to generate second image data configured to be used as input data of the neural network model based on performing a pre-processing operation on the first image data, such that neural network processor is configured to generate third image data based on performing the image processing operation on the second image data; and
a main processor configured to generate corrected image data configured to be displayed on the display based on performing a post-processing operation on the third image data,
wherein the pre-processor is configured to transmit the second image data to both the neural network processor and the main processor, and
wherein the main processor is configured to
   generate fourth image data based on performing a separate post-processing operation on the second image data, and
   generate the corrected image data based on merging the third image data with the fourth image data.

15. The image processing apparatus of claim 14, wherein the neural network model is trained to perform at least one of a remosaic operation, a demosaic operation, a denoise operation, a deblur operation, a gamma correction operation, a high dynamic range (HDR) operation, or a tone mapping operation.

16. A method of operating an image processing apparatus, the method comprising:
obtaining first image data;
generating second image data based on performing a pre-processing operation on the first image data;
generating third image data based on performing an image processing operation on the second image data based on using a neural network model trained to perform one or more particular image processing operations;
generating fourth image data based on performing a separate post-processing operation on the second image data; and
generating corrected image data based on
   performing a post-processing operation on the third image data, and
   merging the third image data with the fourth image data.

17. The method of claim 16, wherein
the first image data is generated by an under display camera located under a display, and
the neural network model is trained to perform the image processing operation on image data generated by the under display camera.

* * * * *